(12) United States Patent  
Bold et al.

(10) Patent No.: US 6,619,372 B2
(45) Date of Patent: Sep. 16, 2003

(54) AIRCRAFT DOOR AND MOLD FOR CASTING THE DOOR

(75) Inventors: Jens Bold, Hamburg (DE); Alexander Engleder, Taufkirchen (DE); Lothar Pollithy, Tapfheim-Erlingshofen (DE)

(73) Assignee: Eurocopter Deutschland GmbH, Donauwoerth (DE)

( * ) Notice: Subject to any disclaimer, the term of this patent is extended or adjusted under 35 U.S.C. 154(b) by 17 days.

(21) Appl. No.: 09/874,914

(22) Filed: Jun. 5, 2001

(65) Prior Publication Data

US 2002/0000494 A1 Jan. 3, 2002

(30) Foreign Application Priority Data

Sep. 18, 2000 (DE) .......................... 100 46 004
Jun. 5, 2000 (DE) .......................... 100 27 314

(51) Int. Cl.[7] ............................ B22C 9/10; B22D 33/04
(52) U.S. Cl. ........................ 164/340; 164/369
(58) Field of Search ................. 164/137, 340, 164/369, 370, 397, 398, 399

(56) References Cited

U.S. PATENT DOCUMENTS

| 4,557,440 A | 12/1985 | Adams |
| 4,662,556 A | 5/1987 | Gidlund |
| 5,119,881 A | * 6/1992 | Cagle .......................... 164/137 |
| 5,262,220 A | 11/1993 | Spriggs et al. |
| 5,752,564 A | * 5/1998 | Callahan et al. ............. 164/137 |
| 6,213,426 B1 | 4/2001 | Weber et al. |
| 6,454,211 B2 | 9/2002 | Entelmann et al. |

FOREIGN PATENT DOCUMENTS

DE 3438584 5/1985

OTHER PUBLICATIONS

U. S. Patent Application Publication US 2001/0004096 A1, Publication Date: Jun. 21, 2001, Entelmann et al.
Technical Data Sheet, "One Piece Cast Door", AHI Data Sheet; Aluvic Hitchcock International; used in Boeing 757 aircraft since 1997.

* cited by examiner

Primary Examiner—Kuang Y. Lin
(74) Attorney, Agent, or Firm—W. F. Fasse; W. G. Fasse

(57) ABSTRACT

An aircraft door has an inner framework integrally connected to an outer skin by simultaneously casting the framework and the skin in a mold that holds a single core for each frame element in the form of a rib in a freight door or a beam in a passenger door. The ribs extend circumferentially relative to a longitudinal central axis of the aircraft. The beams extend in parallel to the central aircraft axis. The single core is selected from at least one core type and four core types at the most. The frame elements in the form of ribs or beams have open arches for a considerable weight reduction.

12 Claims, 17 Drawing Sheets

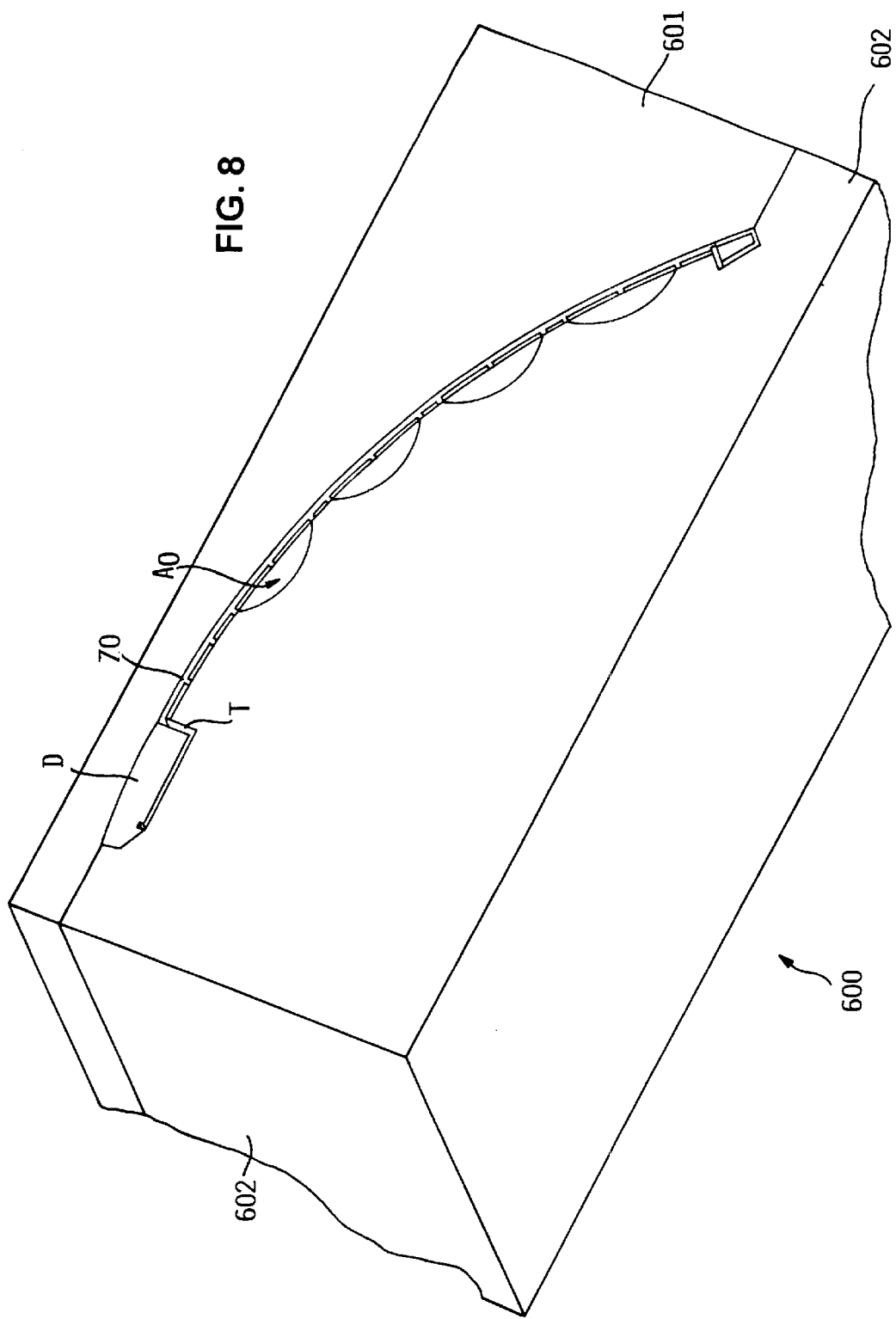

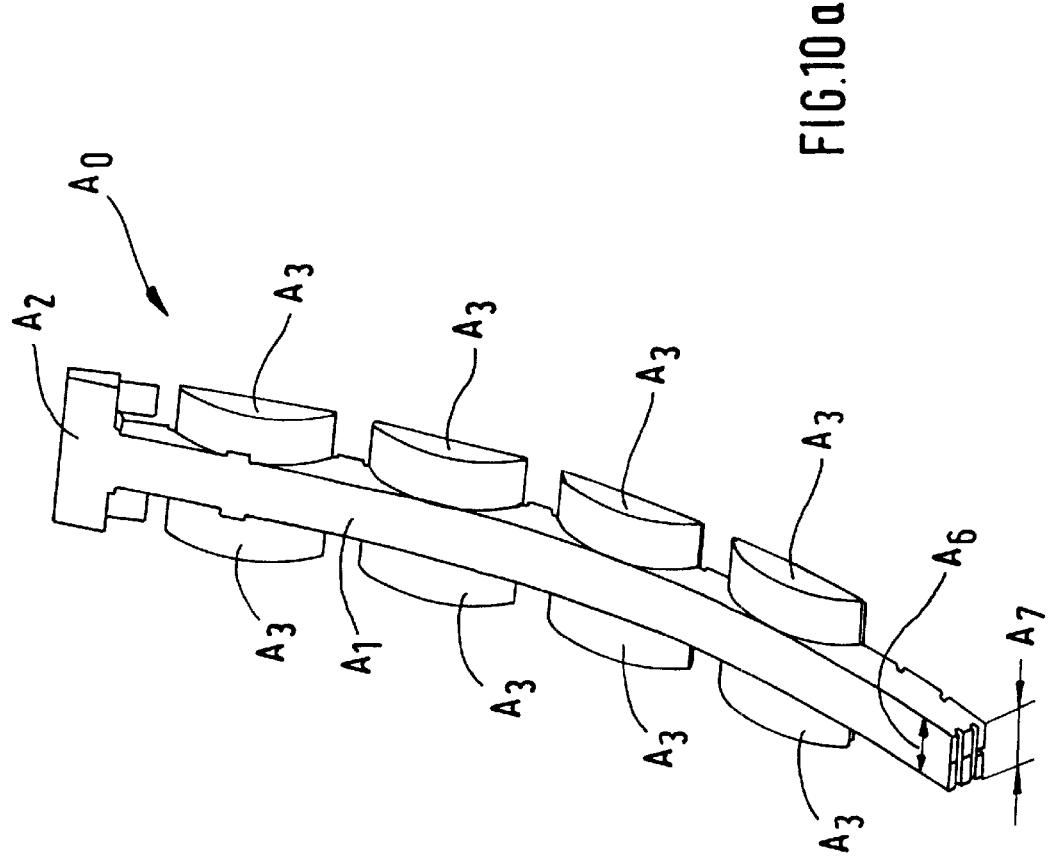

AIRCRAFT DOOR AND MOLD FOR CASTING THE DOOR

PRIORITY CLAIM

This application is based on and claims the priority under 35 U.S.C. §119 of German Patent Applications 100 27 314.9, filed on Jun. 5, 2000; and 100 46 004.6, filed on Sep. 18, 2000, the entire disclosures of which are incorporated herein by reference.

FIELD OF THE INVENTION

The invention relates to an aircraft door with a framework clad by an outer skin connected to the framework. The invention also relates to a molding or casting tool for casting the aircraft door.

BACKGROUND INFORMATION

It is known to cast, including sand casting, aircraft doors, see "Technical Data Sheet": Aluvic Hitchcock International of 1997. Casting and structural details are not disclosed in the "Technical Data Sheet".

Sand casting molds generally include a top part, a bottom part and cores which together determine the shape of the aircraft door structure. The cast aircraft door structure includes an outer skin and a framework, both of which are formed integrally by the casting.

An aircraft door essentially comprises an outer skin attached to a framework. When the aircraft door is closed, the outer skin extends flush with the surrounding surface contour of the fuselage skin. The outer skin of the door is stiffened by the door framework. The framework may include beams extending in parallel to the longitudinal central axis of the fuselage, as is characteristic for example for a passenger door, and/or the door may include ribs extending in a circumferential direction relative to the longitudinal central axis of the fuselage, as is for example characteristic for a freight door of an aircraft. During flight, the framework in particular takes up loads and transfers the loads to the fuselage.

Handling devices are also accommodated in and attached to the door framework, including controllable mechanical and electrical subassemblies, at least for opening and closing the door. As a rule, an aircraft door is connected to the frame of the fuselage by means of a hinge or a joint arrangement. These features apply both to passenger doors and to freight doors. Therefore, the term "door" as used herein is intended to refer to passenger doors and freight doors alike.

Generally, distinctions made between passenger doors and freight doors in aircraft engineering are based upon different functions and on construction differences between passenger doors and freight doors. In the case of a passenger door, the load bearing direction is aligned along the fuselage length, more specifically the loads extend substantially in parallel to the longitudinal central aircraft axis. Thus, carriers referred to as "beams" herein are preferably used in the framework of a passenger door. In the case of a freight door, the load bearing direction is effective in a circumferential direction around the fuselage relative to the longitudinal central aircraft axis. Therefore preferably ribs are used in the framework of a freight door.

Conventionally, the production of an aircraft door takes place in various steps. One step involves producing the framework, with the beams or ribs being spaced apart by individual frame sections secured to the beams or ribs. The outer skin is then connected to the framework by rivets, by a known riveting method, as for example disclosed in U.S. Pat. No. 4,662,556. The riveting operation is relatively time consuming and expensive.

OBJECTS OF THE INVENTION

In view of the above it is the aim of the invention to achieve the following objects singly or in combination:

- to produce an aircraft door by using production steps that are considerably more economical, compared for example to riveting steps or adhesive bonding steps;
- to form an aircraft door made with its skin and framework as a single integral piece in one casting operation;
- to optimally simplify the door framework, so that its integral casting together with the door skin is possible with a correspondingly simple casting mold and core; and
- to construct the mold so that at the most it requires but one single core per beam or rib of the framework, and so that the number of needed core types is minimized.

SUMMARY OF THE INVENTION

According to the invention there is provided a cast aircraft door comprising an inner framework and an outer skin integrally connected to said inner framework by a casting operation, said inner framework comprising frame elements, each frame element having at least one arched frame section, wherein each frame section comprises a plurality of arches and a bridge portion bridging said plurality of arches, said frame element further comprises a cavity in said at least one arched frame section.

According to the invention there is further provided a combination of a mold and core assembly for casting an aircraft door having an inner framework covered by an outer skin integrally secured to said inner framework by simultaneously casting in said mold, said inner framework and said outer skin, said inner framework comprising a plurality of frame elements arranged in parallel to each other, said mold comprising a first mold part and a second mold part and said core assembly consisting of a single core for each frame element.

The present aircraft door avoids in its frame structure numerous undercuts or back tapers so that complicated negative molds and cores for casting these back tapers are also avoided. The production of complicated negative molds is very time-consuming and expensive. The invention avoids using such complicated molds.

In order to cast a beam or rib of an inner aircraft door framework, at the most one core is required for each rib or beam, according to the invention. This is optimal, for it makes possible a fast casting production. The invention avoids the use of a plurality of cores for each rib or beam. Making many cores again and again, inserting and positioning these many cores in the mold prior to casting, is time-consuming and would not allow any significant increase in the rate of door production. The invention overcomes such obstacles in that it provides an advantageous mold with cores of efficient production configurations, whereby only one core is required for each beam or rib and the number of core types or different core shapes is four at the most.

The entire core assembly for casting a passenger door according to the invention is formed by a plurality of individual cores, one of which is provided for each frame element of the door frame to be cast. Each individual core of a first core type has a longitudinal land with cross stubs arranged crosswise to said longitudinal land which essentially corresponds to the length or width of the door, whereby the door length is measured in the circumferential direction and the door width is measured in the axial direction of the aircraft, more specifically the central, longitudinal aircraft axis. Each core has cross stubs spaced apart from each other. The length of a cross stub corresponds to the length of the spacing between two mold markers provided in at least one of the mold parts. When producing a passenger door with beams, for example the respective cores are positioned side-by-side in the mold to extend in the axial direction while spacing the cores from one another in the circumferential direction. The cross-section of the core perpendicularly to the length of the core is trapezoidal. Thus, the cores have an incline that simplifies removing the cast door from the mold.

A preferred door embodiment made by casting is characterized in that the cross-section of the beams and/or ribs of the inner door framework integrally connected to the outer skin, comprise a cavity which is trapezoidal in its cross-section. The trapezoidal cross-section has two parallel sides, one of which is shorter than the other, whereby the longer side is formed by the outer skin. This construction applies to both passenger doors and freight doors. Additionally, the outer skin is stiffened by stiffeners formed or molded on the inwardly facing surface of the outer skin.

These stiffeners are formed on the inside of the outer skin in particular in those places where planes of separation between cores and/or between the top part of the mold and the bottom part of the mold, are arranged. During casting of a freight door, cores are insertable in the mold which at most belong to four different types of cores. In this way, optimally low production costs are achieved by minimizing the number of cores and the core types. Further, by constructing each inner door frame element forming a rib or beam as at least one, preferably two frame sections, the door frame and accordingly each single core for each frame element has a simple configuration or shape, which facilitates the core production and the removal of the finished cast from the mold.

The invention results in clear advantages. Compared to a conventional mold requiring a plurality of cores for each beam or rib, the invention uses at the most one core per beam or per rib. In this way, relatively few cores need to be inserted in the mold. This feature results in reduced production costs because of significant time savings in the production of the present cores compared to the production of a door made by conventional casting methods. In this way, an acceptable mass production becomes possible. Since there are no back tapers, a relatively simple negative mold of the aircraft door is used. The inner segments between beams or ribs and the inner skin surfaces, hitherto required in the case of known doors, have also been avoided by the invention.

BRIEF DESCRIPTION OF THE DRAWINGS

In order that the invention may be clearly understood, it will now be described in connection with example embodiments, with reference to the accompanying drawings, wherein:

FIG. 5 is a sectional view through a portion of a closed mold for producing a passenger door, whereby the section plane IA—IA is the same as for FIG. 1a;

FIG. 8 shows a sectional view of a closed mold including first and second mold portions for casting a freight door, with cores in place inside the closed mold;

FIG. 10a shows one core $A_0$, three of which are shown in FIG. 10;

FIG. 10b shows the reverse or backside of the core $A_0$ of FIG. 10a;

DESCRIPTION OF PREFERRED EXAMPLE EMBODIMENTS AND OF THE BEST MODE OF THE INVENTION

Production using casting technology, essentially the sand casting process is used. The term "sand" as used in this context refers to a mixture of a binder, e.g. resin powder with a hardening agent, and quartz sand.

A negative mold is placed in a molding or casting box, and by means of the sand, a shape, i.e. a sand mold is made from the negative mold. As a rule, two sand mold portions are made: namely a first or top mold and a second or bottom mold which together make up the complete mold that determines the shape of the cast product, often together with inserted cores made of sand. The sand mold is made by mechanical compression or chemical or thermal hardening. The mold comprises inlet apertures for pouring the melt into the mold. Mold equipment according to the sand casting process essentially comprises the mold, the melting furnace with auxiliary units, conveying equipment and filling equipment for pouring the melt into the mold, units for controlling the melt parameters, etc. The melt is a metal melt e.g. a melt of an aluminum alloy or of a magnesium alloy.

The quality of the mold has a decisive influence on the quality and mass production capability of the cast door. Since the mold is made of sand in a mold box, after a casting, the mold is a so-called break-mold or dead mold because it is destroyed when the cast product is removed from the mold. For each door to be cast, a new mold has to be made. Therefore it is essential that the mold and the cores are as simple as possible.

Figure 1:
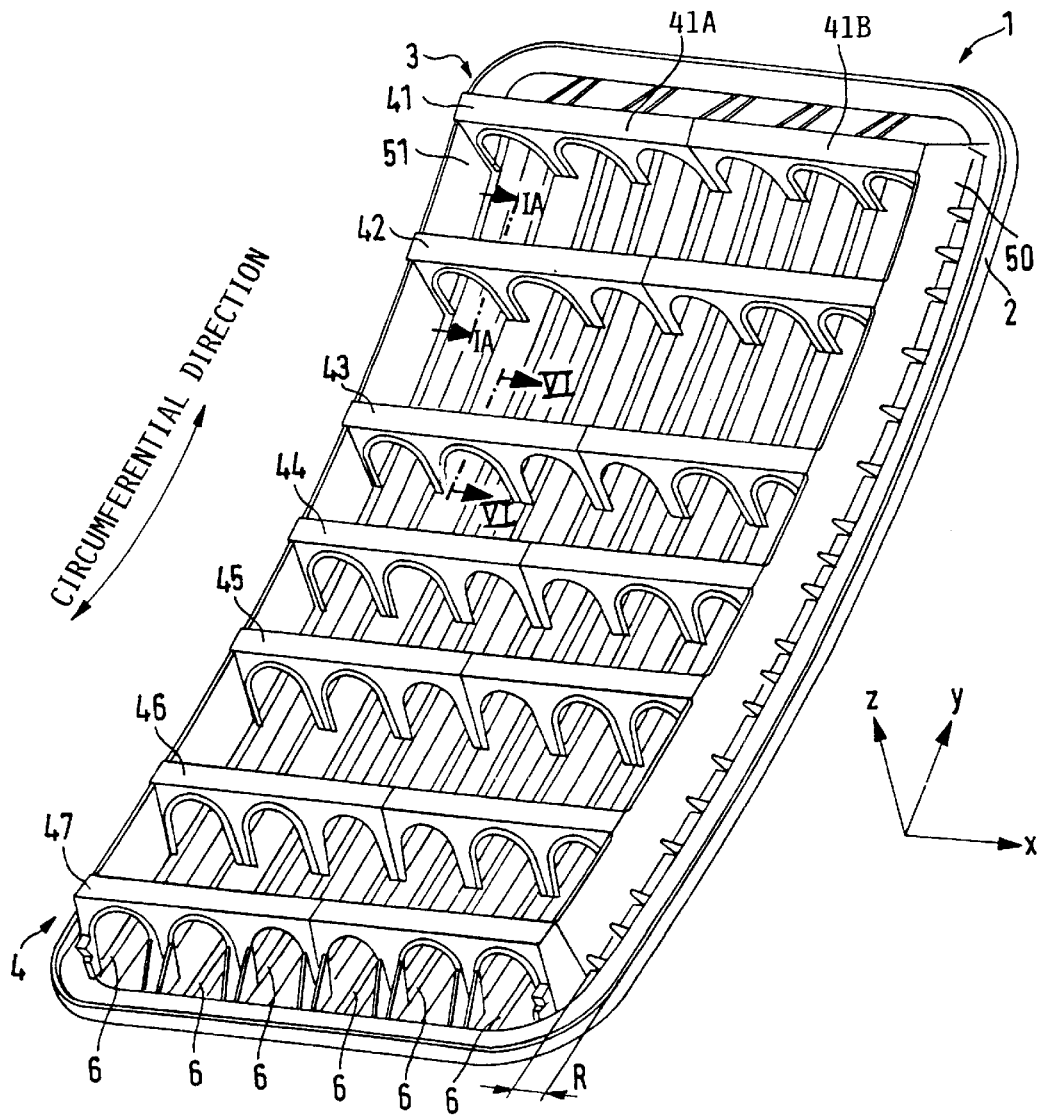
FIG. 1 shows a perspective view onto the inside of a cast passenger aircraft door according to the invention in a state just after removal from the mold and showing the framework with its beams extending in the x-direction corresponding to the longitudinal central aircraft axis.

FIG. 1 shows a door 1 made by sandcasting in the state when the door has just been removed from the mold. To obtain a functional door, the cast door will undergo further production steps so as to comprise separately made up parts or to include handling devices, joint or hinge arrangements, etc. In the present example the cast door 1 comprises an outer skin 2 and an inner door framework 3 which is integrally connected to the outer skin 2 by the casting process since the skin and the framework are cast simultaneously. Corresponding to the surrounding surface contour of the aircraft fuselage 1, the outer skin 2 is curved and the inside of the outer skin 2 is connected to the door framework 3. The door framework 3 can comprise beams and/or ribs which face into the interior of the fuselage. The door framework 3 can be covered on the inwardly facing side by planking (not shown).

The door framework 3 shown in FIG. 1 is an example of a door framework of a passenger door. The door framework 3 of a passenger door is essentially formed of beams 4. FIG. 1 shows seven beams 41, 42, 43, 44, 45, 46, 47, which are aligned in the longitudinal direction X corresponding to the longitudinal central axis of the fuselage. The beams are spaced apart from each other in a circumferential direction around the axis X. The beams 41, 42, 43, 44, 45, 46, 47 are thus essentially distributed over the width and length of the door except for a margin R next to and along the circumference of the outer skin 2. The ends of all the beams 41, 42, 43, 44, 45, 46, 47 are bordered by a rib or panel 50, 51, extending in the Y-direction. The beams 41 to 47 are supported column-like on the inside of the outer skin 2.

Figure 1A:
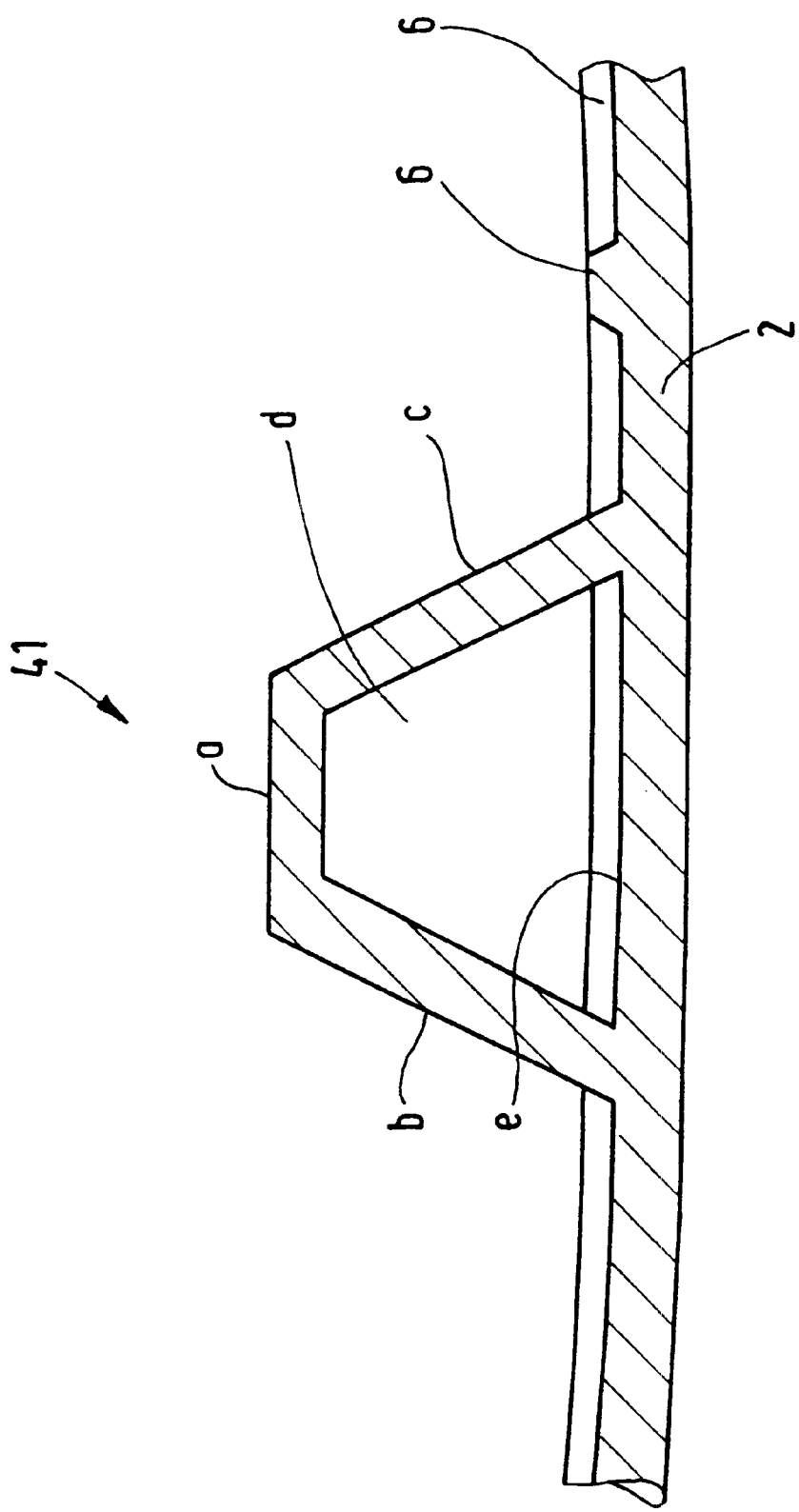
FIG. 1a is a sectional view along section line IA—IA in FIG. 1 through a beam of the framework.

The sectional view shown in FIG. 1a illustrates the integral connection between the door beams, e.g. 41 and the outer skin 2. Each beam 41 to 47 is a framework element which in turn includes at least one arched frame section 41A, 41B, etc., preferably two arched frame sections in the form of covered rows of arches extending in the longitudinal direction X of the fuselage. The two rows of arches have side walls b and c and are covered by cover a to form a respective land. The side walls b, c are inclined towards each other. The two rows of arches 41A, 41B with their side walls b and c enclose with the cover a and the skin 2 a cavity d of essentially trapezoidal cross-section. The larger side f of the trapezoid extends essentially in parallel to the cover a and is formed by the outer skin 2. This cavity d with the trapezoidal cross-section provides advantages for removing of the cast door from the mold because the slanting of the side walls facilitates the removal.

The inside of the outer skin 2 further comprises stiffeners 6 which form part of the outer skin 2 on the inside of the outer skin. Preferably, the stiffeners 6 extend in the circumferential direction around the central axis x, and preferably through the arches of the beams 41, . . . However, arrangement in the X-direction is possible too, so that the stiffeners 6 can also be aligned parallel between the beams 41, . . . . These stiffeners 6 of the skin 2 may even form a grid pattern with stiffeners extending in the X-direction intersecting with stiffeners in the circumferential direction.

The foregoing explanation of a beam 41 according to FIGS. 1 and 1a, with reference to its cross-section also applies without limitation to all other beams 42, . . . and to ribs of the type characteristic for a freight door. Each of these ribs forming frame elements of a freight door framework preferably also comprises two covered rows of arches forming frame sections, with the sides of the arches, inclined towards each other, forming a trapezoidal cross-section of the enclosed cavity as described above with reference to FIG. 1a.

Figure 2:
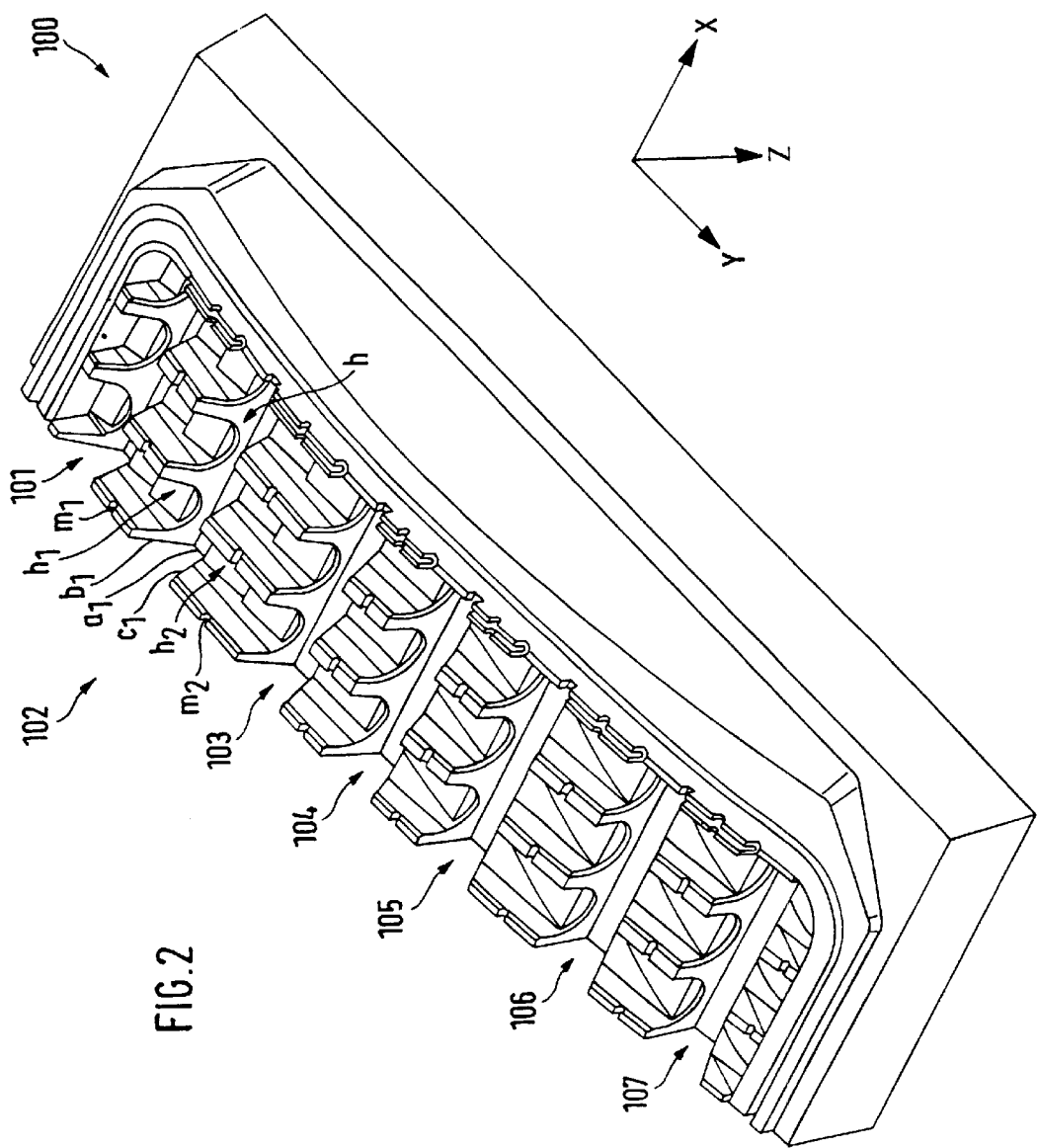
FIG. 2 is a partial perspective view of a bottom or lower mold portion for producing the passenger door of FIG. 1.

FIG. 2 shows a partial view of sandcasting bottom mold part 100, whereby the mold box is not shown. The bottom mold part 100 of the mold essentially provides the shape of the door framework 3, i.e. the shape of the beams 41 to 47. One and only one beam mold core 101 to 107 is provided for casting each framework element 41 to 47 also referred to as beams of the framework. The beam cores 101 ro 107 of the bottom mold part 100 are shown in FIG. 2. Beam core 102 is representative for all beam core 101 ro 107. Core 102 shows the cover contour $a_1$ of the beam to be cast. The two arch forming contours $b_1$, $c_1$ are arranged at an angle to each other. The mold cavity is partially enclosed by the cover contour $a_1$ and the arch forming contours $b_1$, $c_1$. The resulting cavity h will be completed by a core to be inserted later. Cores must be inserted at those positions of the bottom mold part 100 of the mold where cavities are required in the cast door framework. The cavity h extending in the longitudinal direction X comprises branches aligned across its longitudinal axis. The cavity chambers $h_1$, $h_2$ which lead across through the contour of the arches are such branches. The cavity chambers $h_1$, $h_2$ extend between two mold markings $m_1$ and $m_2$ in the circumferential direction around the axis x. For example, h comprises a total of six cavity chambers, only two of these chambers are designated by a reference character $h_1$, $h_2$ in FIG. 2. Although the framework elements or beam 41 to 47 have an intricate shape, it is possible according to the invention to use but one beam core 101 to 107 for casting each beam 41 to 47.

Figure 3:
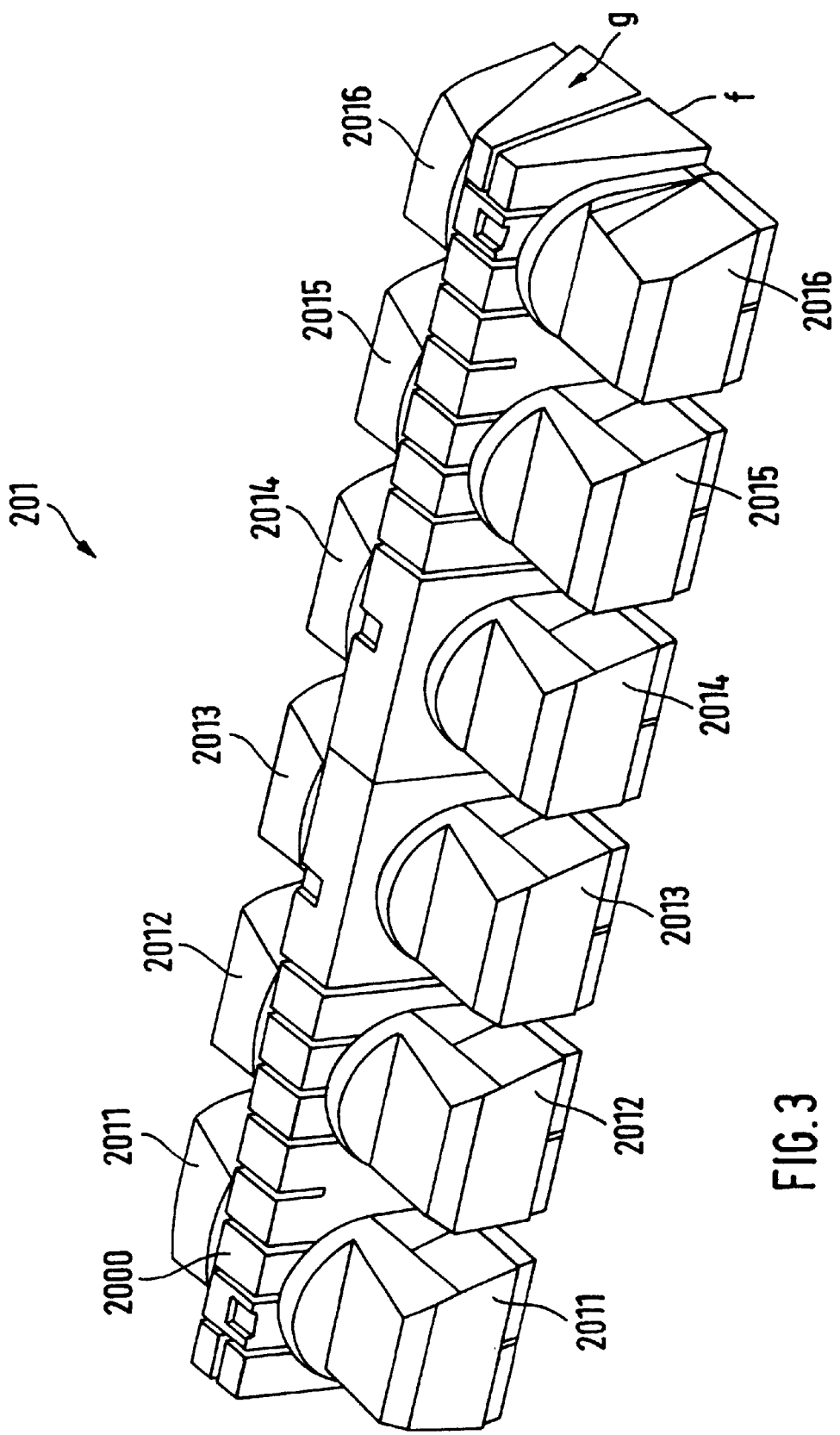
FIG. 3 is a perspective view of a single core for casting one beam as a door frame element in a mold for casting a passenger door.

FIG. 3 is a perspective view of a sandcasting core 201 for forming a single beam or frame element by casting. The core 201 fills the cavity h including the six cavity chambers $h_1$, $h_2$ which are aligned crosswise to the cavity h. The core 201 forms a longitudinal land 2000 with six cross stubs 2011, 2012, 2013, 2014, 2015, 2016. Each cross stub has two portions with one portion extending on each side of the land 2000. It is advantageous if this core 201 is made in one piece. The cross-section g of the longitudinal land 2000 is essentially trapezoidal. The longitudinal land 2000 extends across the width of the bottom mold part 100, thus corresponding to the length of the beam or frame element. The large side f of the trapezoidal cross-section g, of the longitudinal land 2000, faces the inside of the outer skin 2 not shown in FIG. 3. The length of each cross stub 2011 to 2016 of the core corresponds to the distance between the mold marking $m_1$ and the mold marking $m_2$ shown in FIG. 2. The cross stubs of adjacent cores abut against each other at the mold markings $m_1$ and $m_2$. The core 201 is to be inserted in all beam molds 102 to 107, see FIG. 2. The core 201 is made of casting or molding sand.

Figure 4:
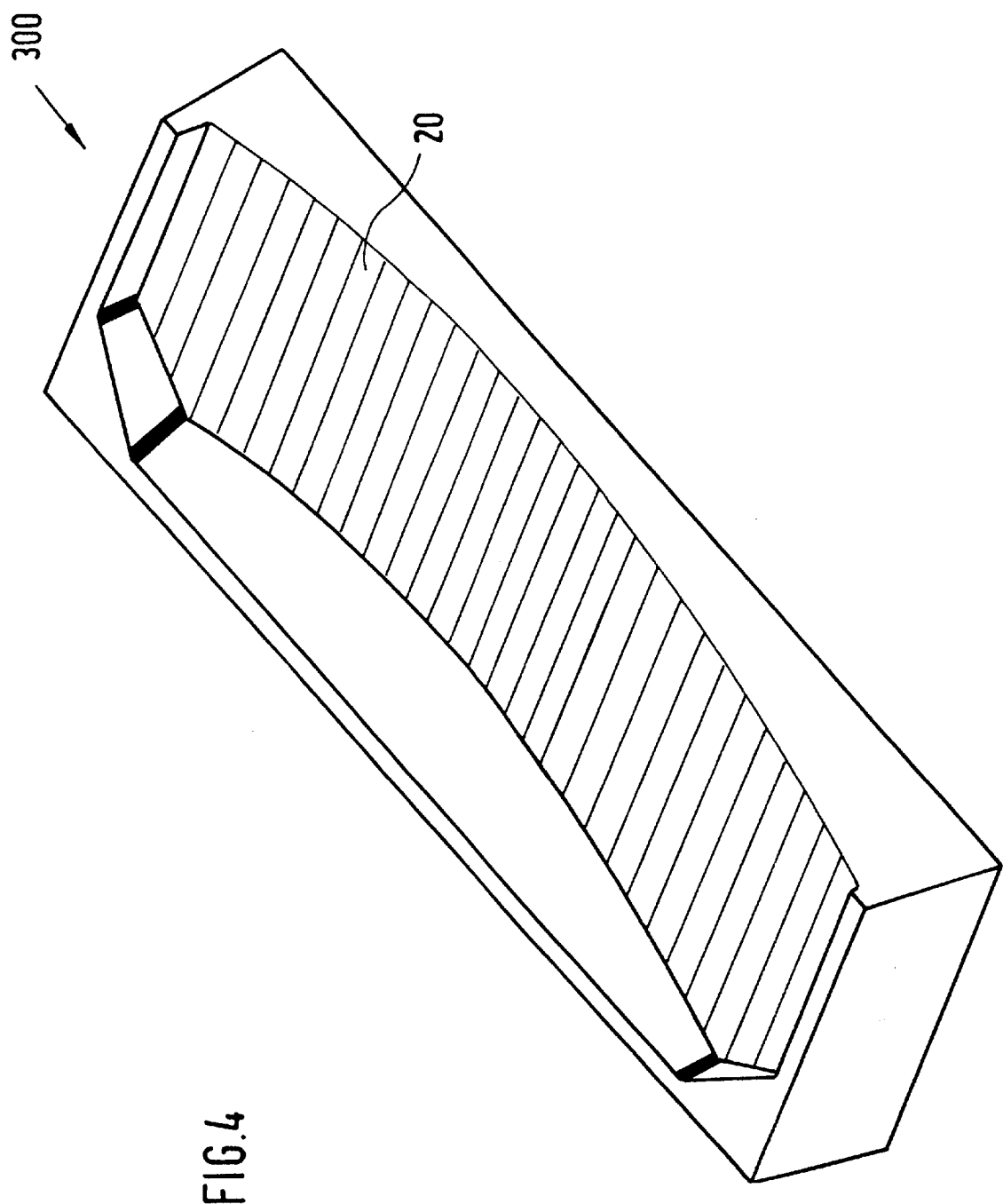
FIG. 4 shows a perspective view of an upper or top mold portion for producing a passenger door.

FIG. 4 shows a top or first part 300 of the mold. The bottom or second part 100 of the mold with the seven inserted cores 201 to 207 has to be covered by the top part 300 prior to casting. The top part 300 of the mold forms the outer skin 20 during casting. The top part 300 of the mold provides a positive-fit seal against bottom part 100 of the mold and the seven inserted cores 201. The mold parts 100 and 300 together constitute a casting tool referred to simply as mold. The mold comprises supply channels for supplying the melt into the mold. Risers, i.e. upward-leading holes, are provided for the displaced air, such risers filling with melt towards the end of casting.

Figure 5:
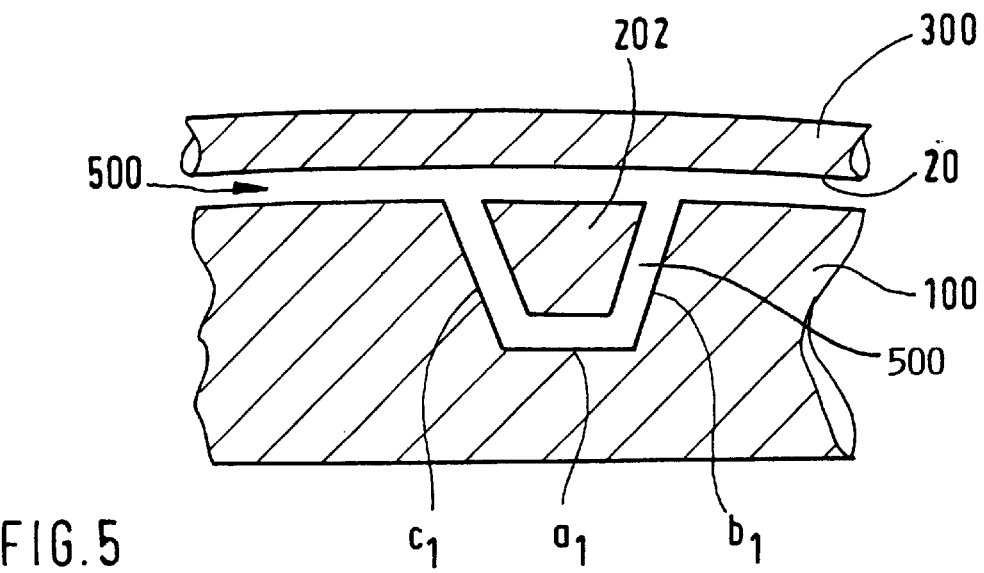

FIG. 5 shows schematically a section through a portion of the closed mold, whereby the section plane is the same as for FIG. 1a. The bottom part 100 of the mold, the core 202 and the top part 300 of the mold show a portion of a casting space 500 into which melt has to be poured. On the bottom part 100 of the mold, the cover contour a1 and the arch contours or sidewalls b1, c1 are shown.

Figure 6:
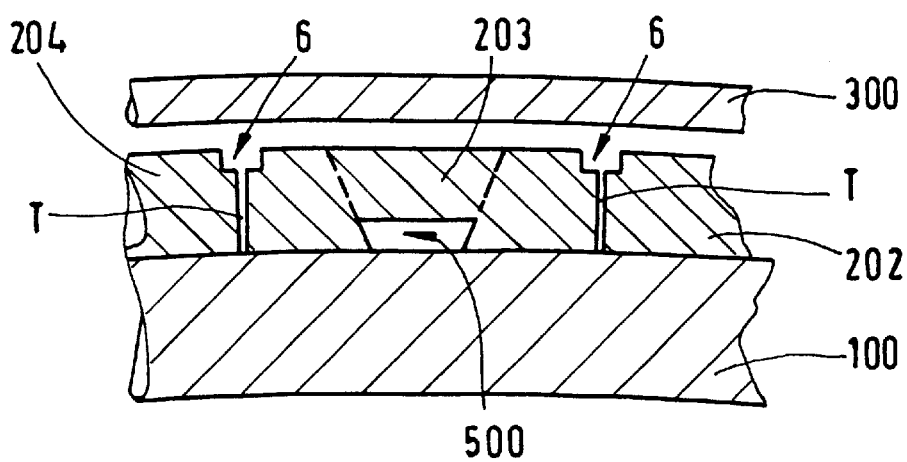
FIG. 6 is a sectional view through a mold portion for producing a passenger door, whereby the section plane VI—VI is shown in FIG. 1.

FIG. 6 shows schematically a section along section plane VI—VI in FIG. 1. FIG. 6 illustrates a portion of the closed mold. The partial section of the top part 300 of the mold, the core 203 and the bottom part 100 of the mold, show a portion of a casting space 500. Each core 203 has the shape required for the formation of the longitudinal land 2000 flanked by sides slanting toward each other away from the outer skin. Thus, all the cores essentially have the cross-section of a truncated pyramid. Such a shape makes the core removal from the mold very easy, i.e. fast removal from the mold is possible.

The core 203 is positioned between the cores 202 and 204, whereby a relatively thin gap T is formed between each of two neighboring cores. The gap T provides a respective plane of separation. The stiffeners 6 are formed along these planes of separation or gaps T where the gaps face the respective interior surface of the outer skin 20 shown in FIG. 4. Further stiffeners 6 can also be formed in places where a region of the top and bottom parts of the mold face each other. Further stiffeners crossing the first mentioned stiffeners 6 may also be formed to provide a skin stiffening grid pattern.

Figure 7:
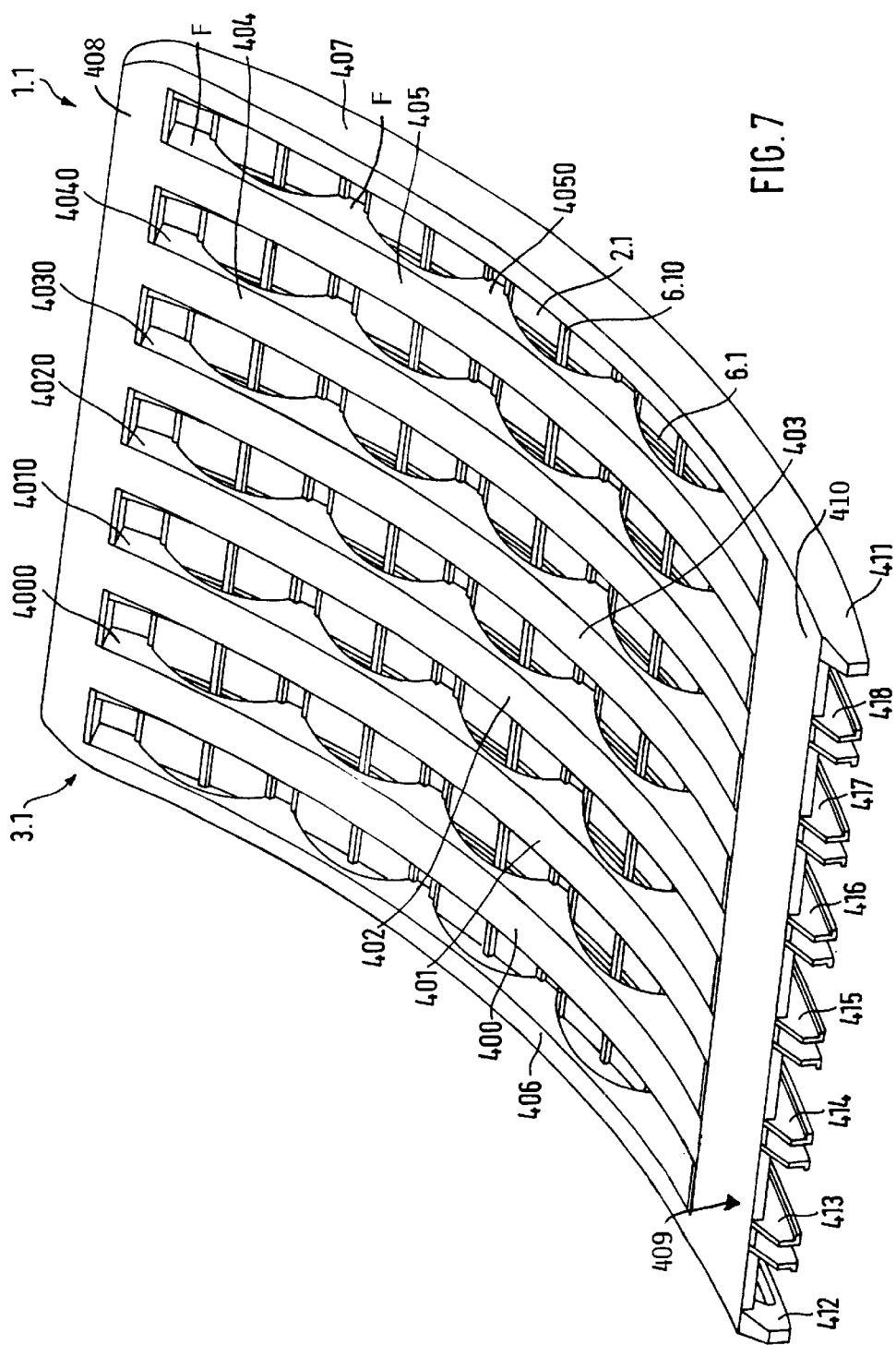
FIG. 7 shows a view onto the inside of a cast freight door just removed from the mold, wherein the frame elements in the form of ribs extend circumferentially relative to the central longitudinal aircraft axis which is the x-direction.

FIG. 7 shows a cast freight door in the state following removal from the mold, with a view onto the inside of the door, whereby the curvature of the freight door is apparent. This curvature matches the curvature of the fuselage not shown. Ribs 400, 401, 402, 403, 404, 405 are shown in detail. The ribs are bordered by a frame 406, 407, 408, 409 including lateral frame ribs 406, 407, an upper frame beam 408 and a lower frame beam 409 which may be later covered with an inner door cover or which may form itself with its inwardly facing surface part of an inner door cover 410. Please also see FIG. 7a. These ribs 400 to 405 including the lateral frame ribs 406, 407 and the upper and lower frame beams 408, 409 constitute the framework 3.1 of the freight door which is cast together with the skin 2.1 for an integral connection between the framework and the inside of the outer skin 2.1. The inside of the outer skin 2.1 comprises stiffeners 6.1 and 6.10 which are aligned both in the direction of the circumference and in longitudinal direction of the fuselage thereby forming a stiffening grid pattern as an integral part of the outer door skin 2.1.

The closing and opening movement of a freight door differs from that of a passenger door. As a rule a freight door can be hinged outwardly and upwardly. Hinges or joints (not shown) are attached to the upper frame beam 408. The cooperating counterpart hinge or joint elements are attached to the frame around an opening of the fuselage. The freight door 1.1 is tiltable with the aid of these hinges or joints, whereby the door can be opened and closed by operating a manual lever which is built into the fuselage structure next to the freight door but is not shown. Such a manual lever cooperates with a mechanical arrangement for activating an actuator in the freight door to move the freight door by means of a push rod journalled to the door framework.

Hinge connector flanges 413, 414, 415, 416, 417 and 418 have mounted therein rotatable hooks (not shown). These hooks in the closed position of the freight door 1.1, are lockable in eyes provided in the fuselage next to the door opening. The locking of the hooks in the eyes can, for example take place by operating another outer manual lever in the freight door (not shown). Thus, the load bearing direction of the freight door extends in the circumferential direction of the fuselage relative to the central longitudinal axis x. Corner stiffeners 411, 412 provide the necessary guidance to, and a stable limit stop at the frame that surrounds a freight door opening in a freight carrying aircraft. A seal (not shown) is placed on the framework between the inwardly facing surface of the framework 3.1 and an inner door cover not seen in FIG. 7.

FIG. 7 further shows a row of arches 4000, 4010, 4020, 4030, 4040 and 4050 between the ribs 400, 401, 402, 403, 404 and 405. Due to the view direction of FIG. 7, the associated other or opposite row of arches is covered and hence not seen. The rows of arches are arranged such that they form passages through which for example the skin stiffeners 6.10 can pass without interruption on the inner surface of the outer skin 2.1. The outwardly facing bases F of the row of arches are integrally secured to the inside of the outer skin 2.1 by the casting operation which forms the ribs, the skin and the arches in one and the same casting operation.

Figure 7A:
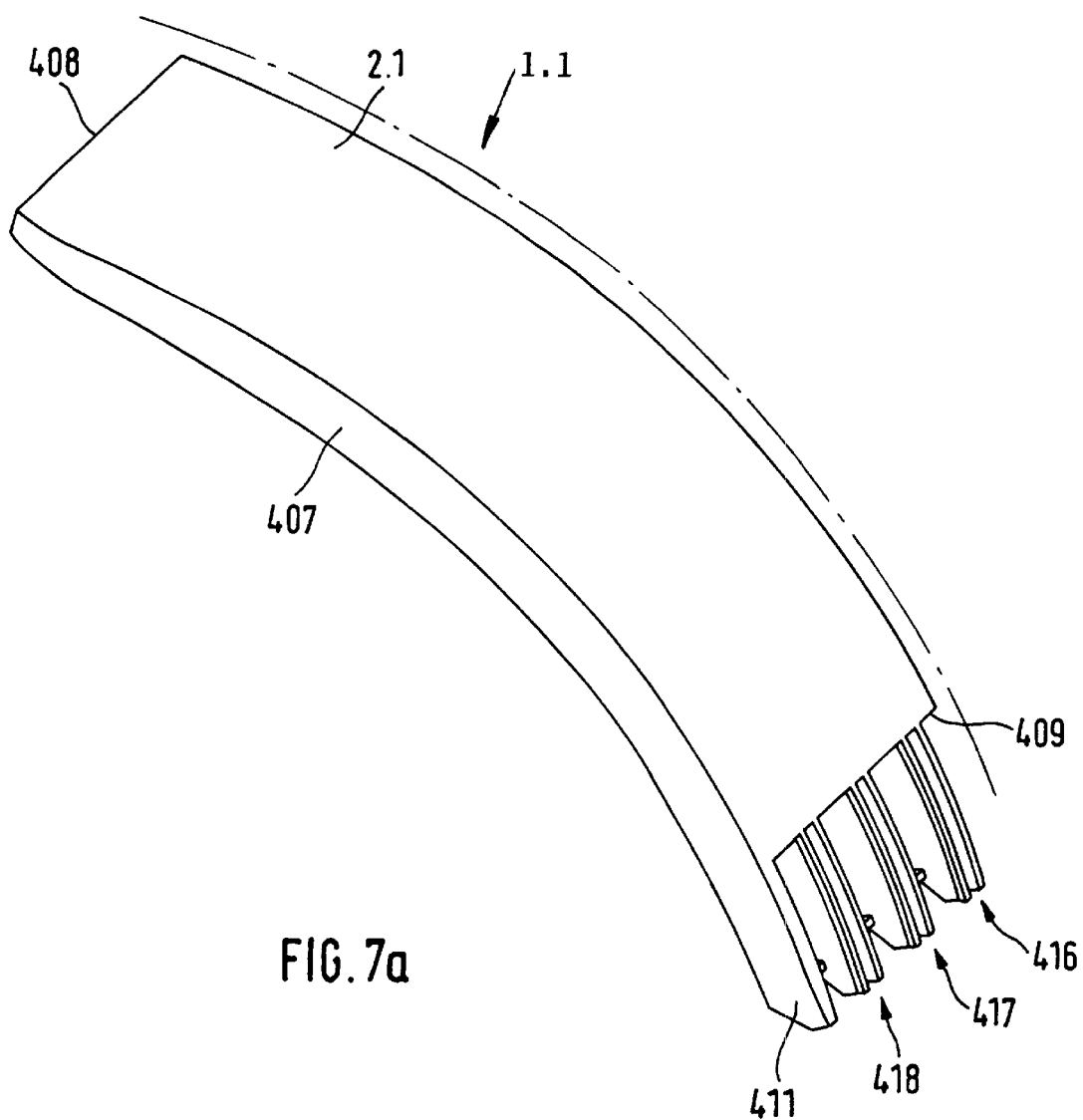
FIG. 7a shows a perspective view of a portion of the skin covered outside of a cast freight door just removed from the mold.

FIG. 7a shows the outwardly facing skin 2.1 of the freight door 1.1, the inside of which is seen in FIG. 7. For the sake of simplicity only half of the freight door is shown. In this view the outer skin 2.1 is limited by the upper frame beam 408, the lower frame beam 409 and by the lateral frame rib 407. The other frame rib 406 is not seen in FIG. 7a since only half of the door is shown. The frame comprises corner stiffeners, but only corner stiffener 411 is visible. Between the two corner stiffeners 411, 412 there are connecting flanges, with connecting flanges 416, 417 and 418 being shown.

The freight door ribs 400, 401, 402, 403, 404, 405 of the framework 3.1 also have a cross-sectional configuration that encloses a cavity having a trapezoidal cross-section, whereby the larger side e of the essentially parallel trapezoidal sides a and e is formed by the outer skin 2.1. Thus, a rib is formed by two rows of covered arches, extending in the circumferential direction of the fuselage. The side walls b and c of the rows of covered arches are inclined towards each other to form the trapezoidal cross-section of the cavity while simultaneously providing a so-called mold removal incline by an angle between a line perpendicular to the inside of the outer skin and the inclination of the side walls b and c of a row of arches. In the case of a freight door this mold removal incline preferably encloses an angle of about 1–2°, which is an optimal range for an easy mold removal. Please see also FIG. 1a. The same angle range is useful for a passenger door.

FIG. 8 is a simplified view of a mold 600 whereby a viewing plane passes lengthwise through the mold. A first or top mold part 601 and a second or bottom mold part 602 are shown. Cores $A_0$ and D are inserted between the first and second mold parts, please compare FIG. 10. The cores are inserted in the second part 602 of the mold which thus is also referred to as the bottom part 602. If now the first or top mold part 601 is placed with a positive fit on the bottom part 602 holding the cores, a casting space 70 is enclosed in the mold into which a metal melt, for example an aluminium alloy or magnesium alloy melt, can be poured, whereby the casting space 70 determines the shape of the freight door. Between the core $A_0$ and core D a gap T is formed, which shapes the lower frame beam 409. Core D is independent and, among other things, helps forming the inner skin which is not shown in FIG. 8. The core D will be described in more detail below.

Figure 9:
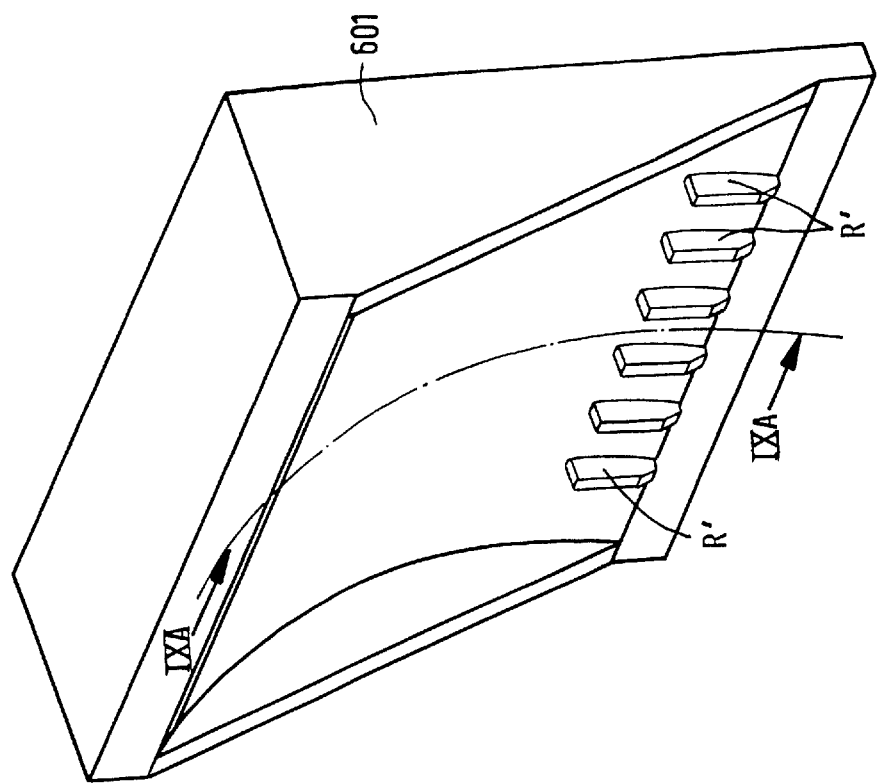
FIG. 9 is a perspective view of the first mold portion also referred to as the top or upper mold portion of the mold of FIG. 8.

FIG. 9 shows perspectively the top part 601 in an open position compared to the closed position in FIG. 8. The raised shapes in the region of the lower edge of the top part 601 of the mold form the connection flanges 416, 417, 418 of the freight door.

Figure 9A:
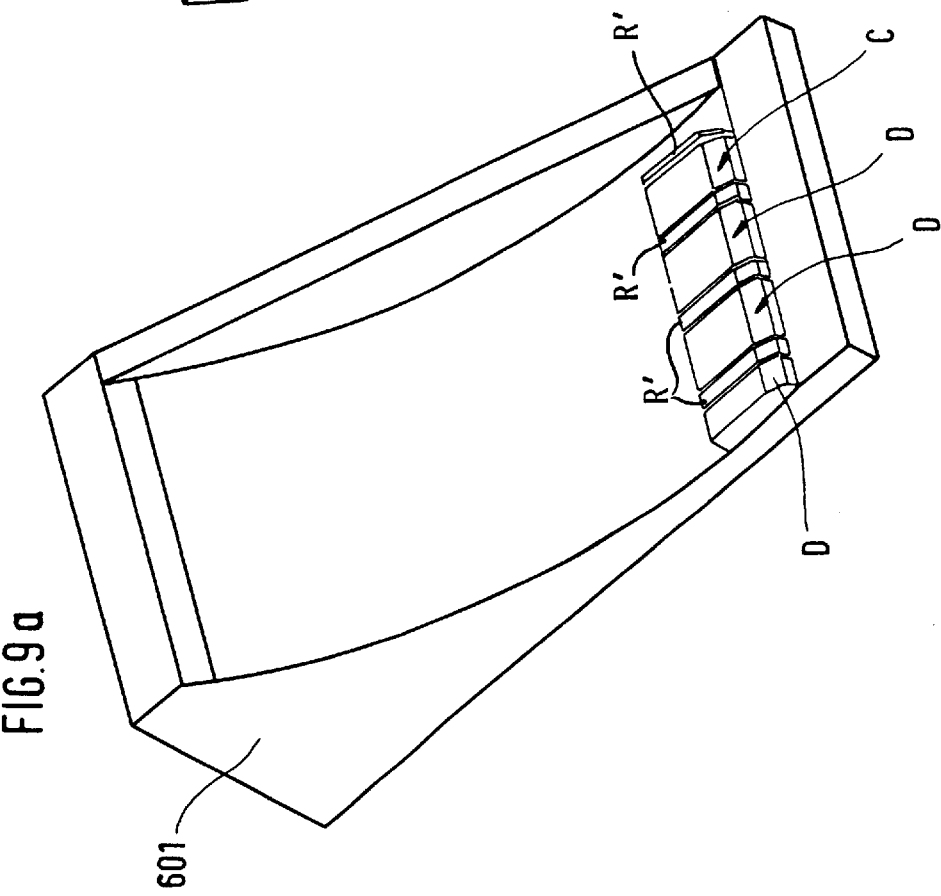
FIG. 9a is a perspective view of the first or top or upper mold portion of the mold of FIG. 8, cut along section line IXA—IXA in FIG. 9.

FIG. 9a is a perspective view of a portion of the top mold part 601 with certain cores C, D inserted and with the viewer facing side in a section plane IXA—IXA shown in FIG. 9. Two different types of cores are used in this instance. Core C is used to shape the corner stiffeners 411 and a section of the inner skin, not shown. Core C is delimited by a raised part R' in the top part of the mold. However, the raised part is so positioned that a gap remains between core C and the raised part R'. On the side of the core C opposite of the raised part R' of the mold, a core D is inserted. Each core D is located between two raised parts R' of the mold. Here too, gaps between the core D and the raised parts R' are maintained. These gaps make it possible to pour the connection flanges 416, 417, 418 seen in FIG. 7a.

Figure 10:
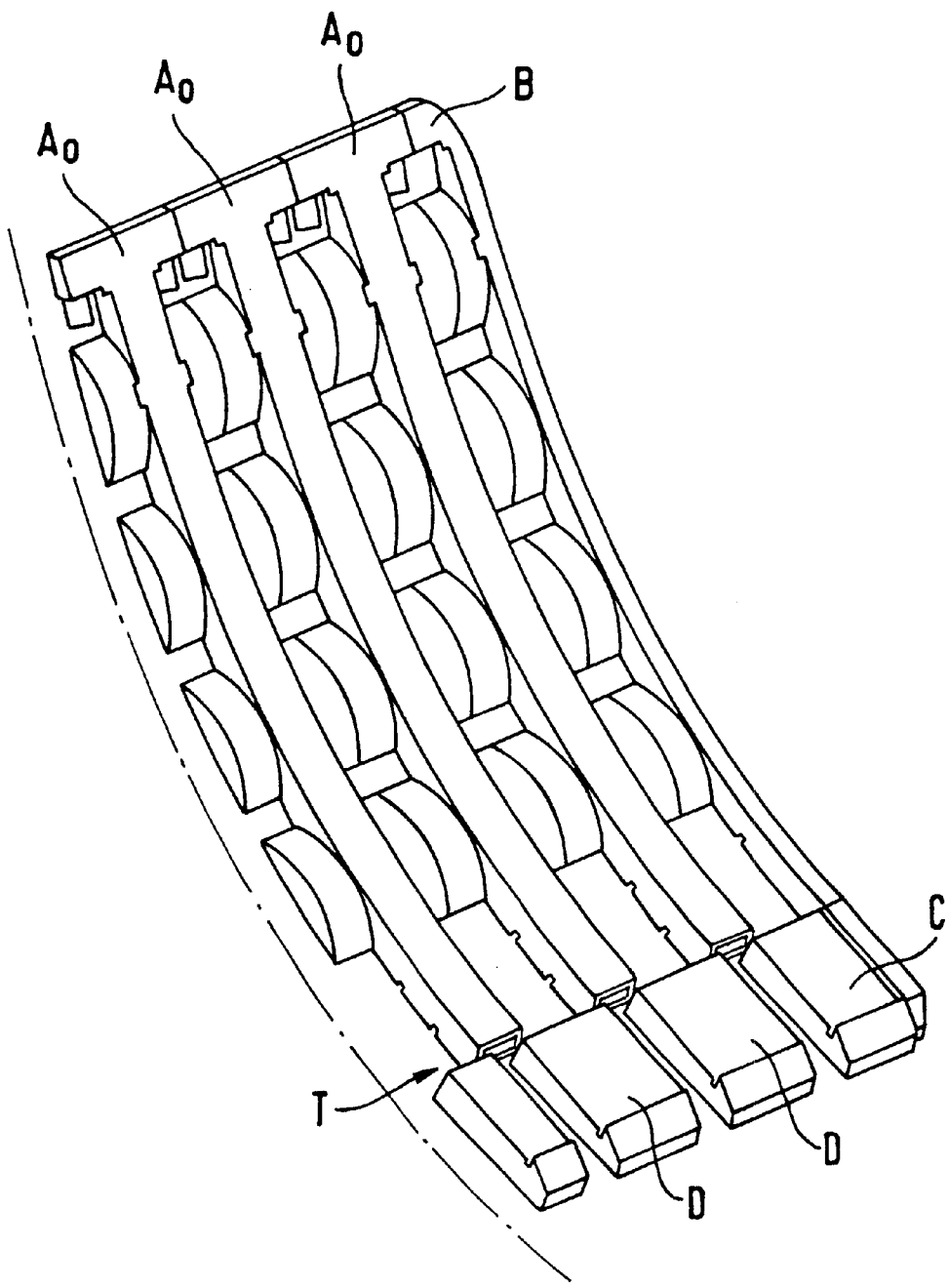
FIG. 10 shows cores to be inserted in the mold of FIG. 8, whereby a portion of a full assembly of cores has been cut off to avoid a repetitious illustration.

FIG. 10 shows cores to be placed into a mold portion for casting a freight door. According to the invention at most four different types of cores have to be placed into the mold. A core $A_0$ is one core type and the required number of cores $A_0$ depends on the geometric dimensions, e.g. the width of the freight door. A core B is a further core type and forms a lateral frame rib. Cores $A_0$ and B can be interconnected in a positive fit. A gap T separates the two following core types C and D from core $A_0$ and core B. Core C is used to form the elongated corner stiffener 411 by extending the lateral frame rib 407 as well as forming a section of the inner skin, not shown. Core D is located beside core C. Core D also helps forming a section of the inner skin as well as connecting flanges 416, etc. The number of cores D also depends on the dimension of the freight door. Part of a complete set of cores is not shown in FIG. 10 for simplifying the drawings.

Figure 10B:
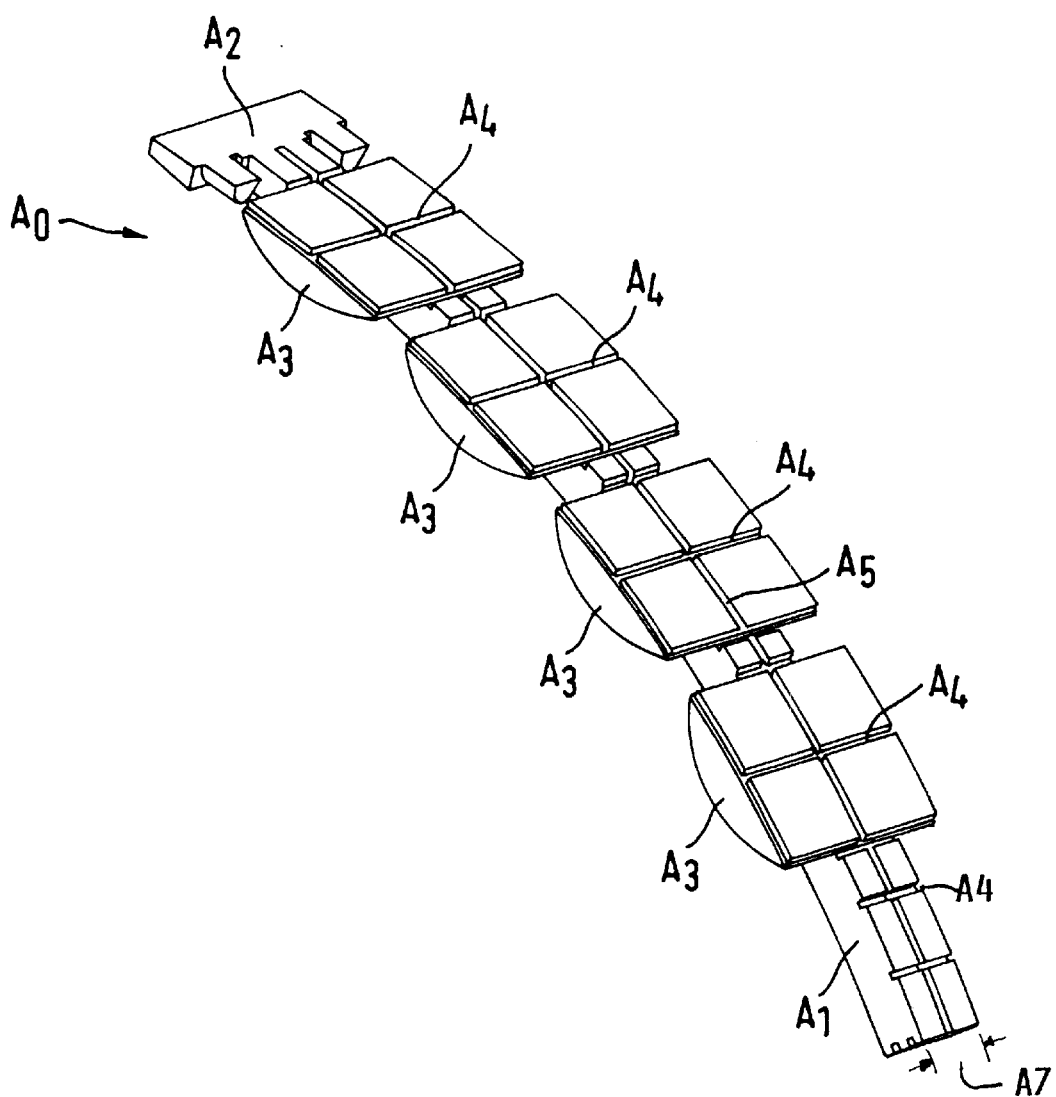

FIG. 10a shows the inwardly facing surface of a core $A_0$ while FIG. 10b shows the outwardly facing surface of the core $A_0$. The core $A_0$ comprises a core rib portion or land $A_1$ having a length corresponding to the length of the freight door in the circumferential direction. The upper end $A_2$ of the rib portion $A_1$ forms an upper frame portion. Across the rib portion or land $A_1$, stubs of arches $A_3$ are shaped on both sides of each core rib portion. Several stubs of arches $A_3$ are arranged, one behind another and spaced apart, along the length of the core rib portion or land $A_1$. The width $A_6$ of the land facing inwardly is shorter than its base width $A_7$ facing outwardly to facilitate the removal of the core after casting. The core $A_0$ according to FIG. 10a is placed in the bottom part 602 of the mold shown in FIG. 8.

As shown in FIG. 10b, the reverse side of the core $A_0$ facing outwardly protrudes into or rather defines one side of the casting space 70 shown in FIG. 8. Cross grooves $A_4$ and a circumferential groove $A_5$ provide access for the melt into all portions of the casting space 70 for forming the skin stiffeners ribs 6.1 and 6.10 according to FIG. 7. As is the case with all cores, core $A_0$ also comprises a mixture of sand and hardening agent which after exposure to the heat of the melt becomes flowable for removal from the door framework through the open arches formed in the ribs and beams, seen in FIGS. 7 and 13a.

Figure 11:
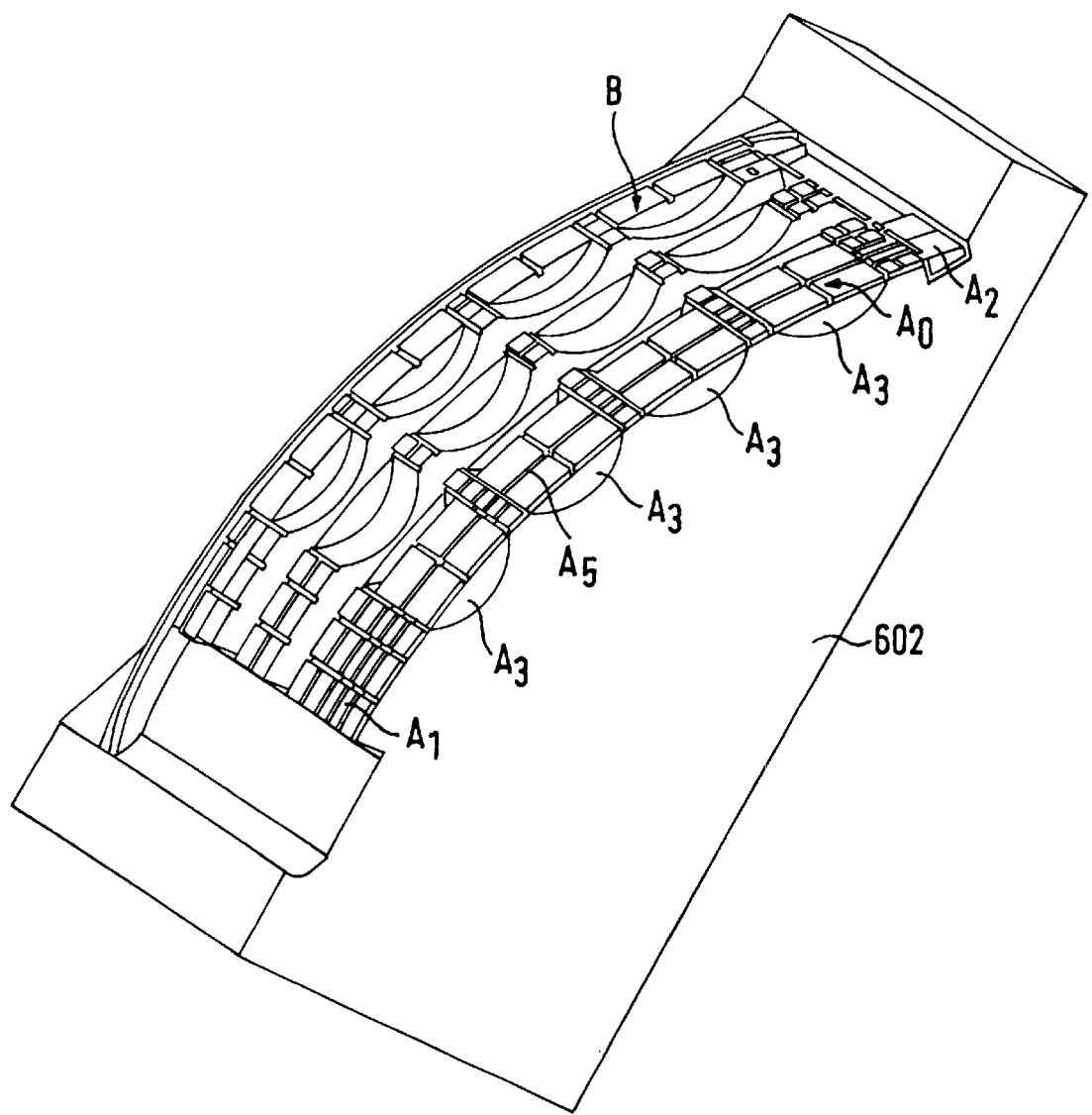
FIG. 11 is a partial view of the second or lower mold portion of FIG. 8 with one inserted core and one inserted core $A_0$.

FIG. 11 shows a portion of the second or bottom or lower mold 602 with cores $A_0$ and B in place. Core B, also shown in FIG. 10, forms the lateral limitation of the shape of a freight door in the closed mold. To provide a better view of the bottom mold, the following cores $A_0$ are not shown. Instead, only one core $A_0$ is shown in the bottom mold. Core $A_0$ corresponds to the illustration of core $A_0$ in FIG. 10b. As is shown, the stubs forming the arches $A_3$ of the core $A_0$ are arranged in the bottom part 602 of the mold in a positive fit.

Figure 12:
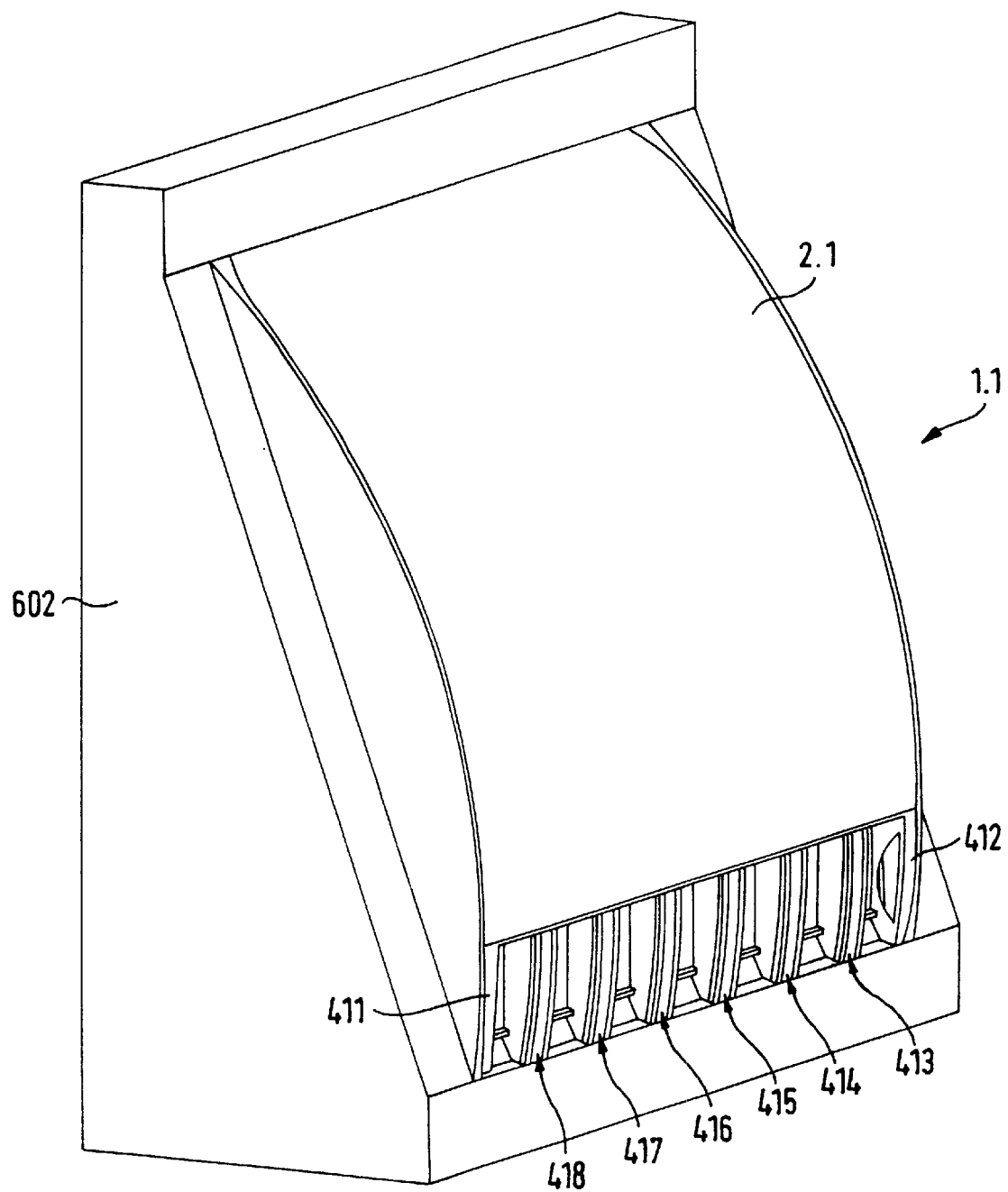
FIG. 12 is a view of the second or lower mold portion with a cast freight door still in the mold showing the outer door skin and the hinging or connecting flanges.

FIG. 12 shows a view of the bottom part 602 of the mold with a cast freight door 1.1 still in place in the mold. The top part 601 of the mold has already been removed. The outer skin 2.1 of the freight door and the connecting flanges 413, 414, 415, 416, 417 and 418 as well as the two stiffeners 411, 412 of the door 1.1 are visible.

Figure 13:
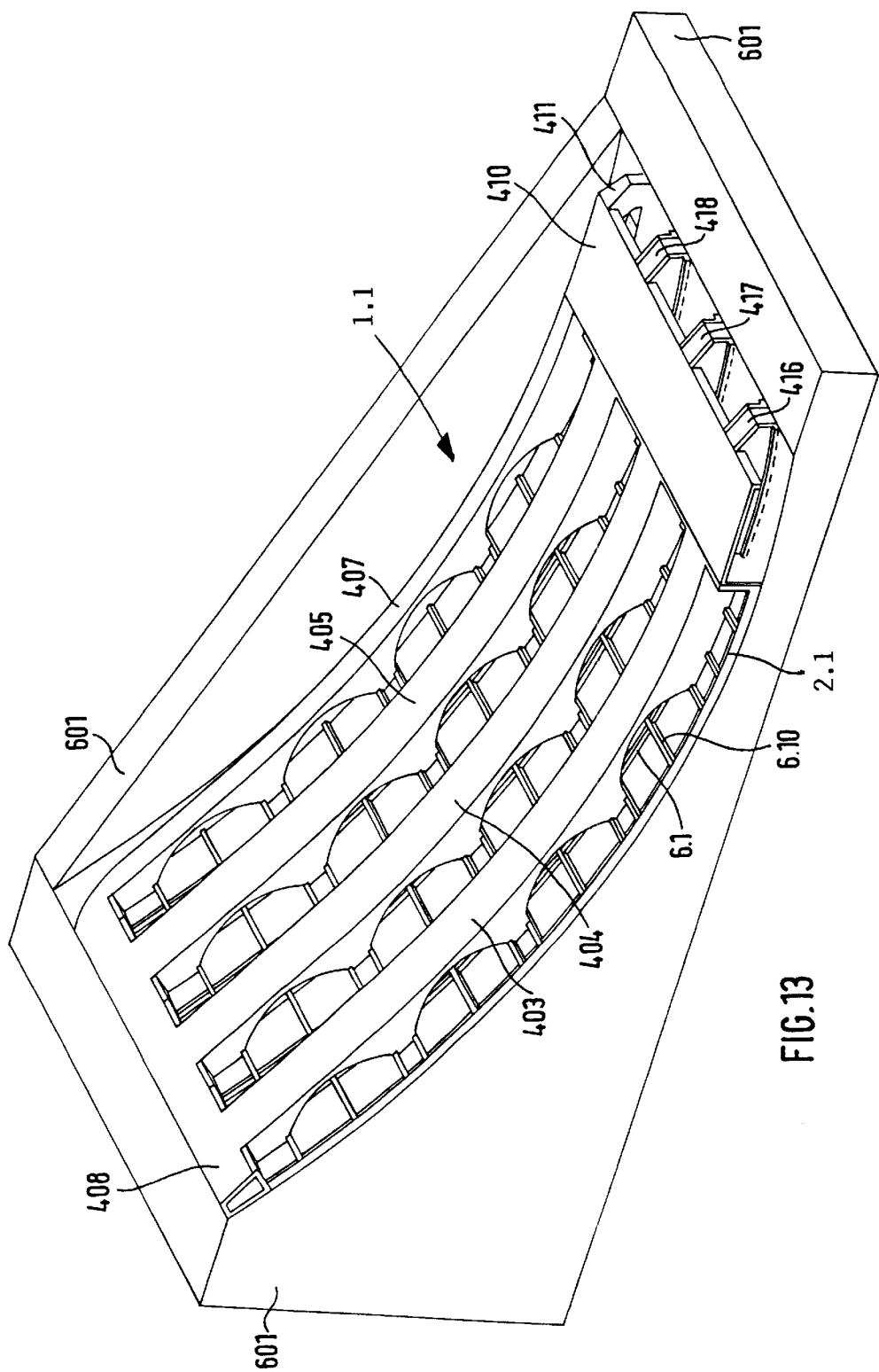
FIG. 13 is a view of the second or lower mold portion with a cast freight door still in the mold, but showing the inwardly facing side of the door.
Figure 13A:
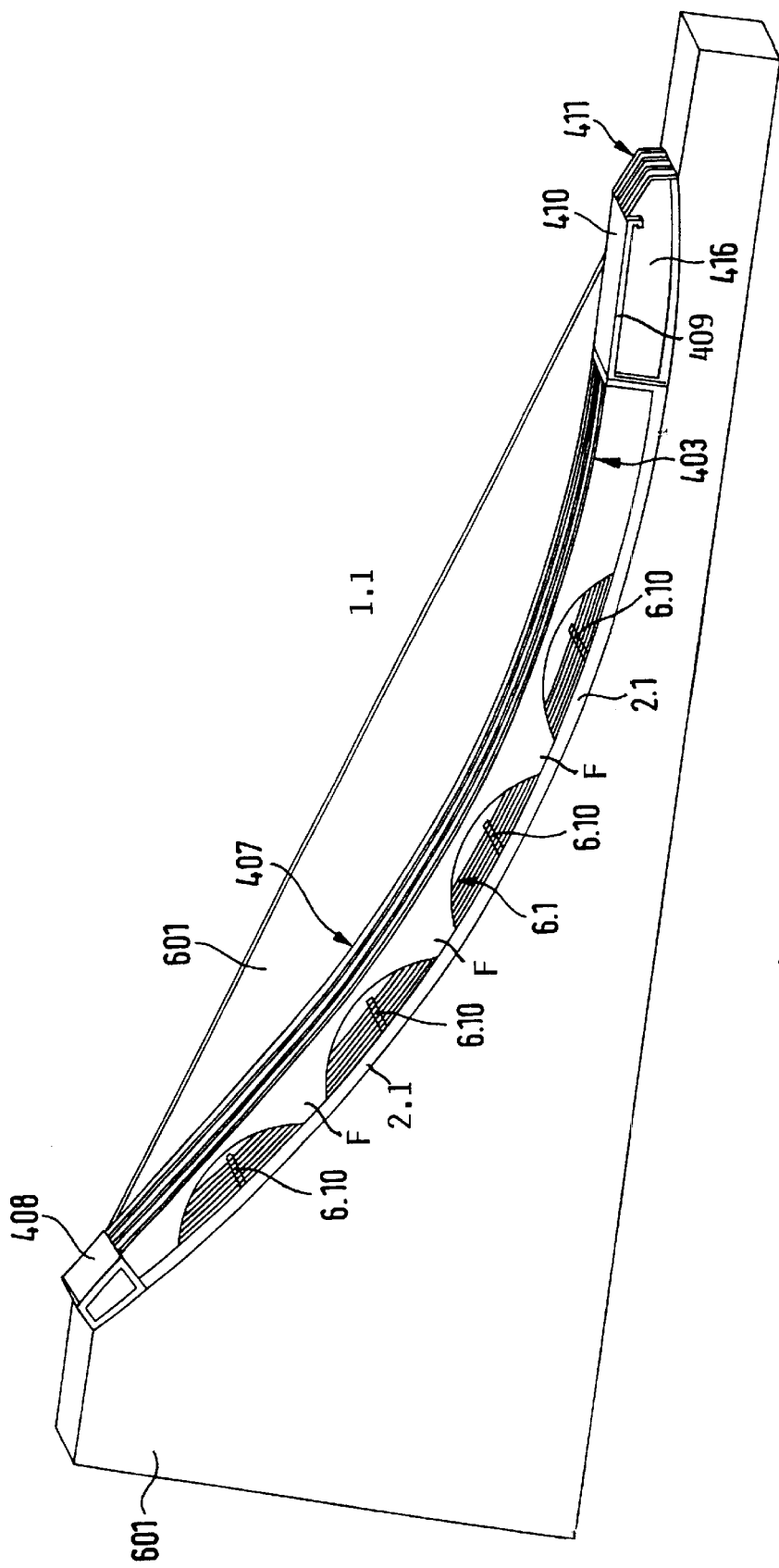
FIG. 13a is a side view of FIG. 13 with a portion of the mold cut away.

FIG. 13 shows a view of a modification in which the cast door remains initially in the top part 601 of the mold rather than in the bottom mold part 602. The inside of the freight door 1.1 is shown. This view corresponds substantially to the representation of the freight door according to FIG. 7. In the view of FIG. 13, all the cores and the bottom mold 602 have already been removed. FIG. 13 clearly shows that the ribs or lands 403 . . . are cast together with the outer skin 2.1 and with the skin stiffeners 6.1 and 6.10 forming a grid structure. Slight rotation of FIG. 13 results in a side view of the top part 601 of the mold and of the freight door 1.1 as seen in FIG. 13a, wherein the freight door 1.1 is still held in the top mold 601, however with a portion of the mold and door cut away to simplify the illustration. The outer skin 2.1 of the freight door 1.1 rests against the top part 601 of the mold in a positive fit. The row of arches of the rib 403 is clearly shown. Hidden behind the visible row of arches is the other not visible row of arches of the rib or land 403. The two rows of arches of the rib 403 and the flange 416 of the rib 403 together with the inside of the outer skin 2.1 form a trapezoidal cross-section, not shown in FIG. 13a. At the lower end of the ribs 403 . . . the lower frame beam 409 is shown covered with or forming an inner skin 410 formed by the sand casting process. The lower frame beam 409 with its inner skin 410 carries the connecting flanges 416 . . . , etc. Only the connecting flange 416 is seen in FIG. 13a. These connecting flanges are bordered by the corner stiffener 411. Footings F of all the arches are integrally connected to the outer skin 2.1 by the casting.

The invention provides the advantage in that, compared to conventional casting, relatively few cores or types of cores, e.g. four, are necessary for casting the freight door. To cast the freight door 1.1 according to FIG. 7, six cores corresponding to core type $A_0$, two cores corresponding to core type B, two cores corresponding to core type C and five cores corresponding to core type D, are required. Altogether, fifteen cores are used falling into four different core types. This is a very small number of core types. The sand casting process is thus very efficient with an optimally reduced effort and expense.

Handling devices such as locking and unlocking devices for the aircraft door can be accommodated and mounted in the cast framework of the door.

The arches and hollow ribs and/or beams of the cast door result in a significant weight reduction. The use of but a few core types considerably shortens the production time of the aircraft door according to the invention.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A mold and core assembly for casting an aircraft door (1), said aircraft door having an inner framework (3) covered by an outer skin (2), said inner framework (3) having a first number of framework elements (41, 42 . . . ) arranged in parallel to each other, said mold and core assembly comprising a first mold part (100), a second mold part (300) and a second number of mold cores (101, 102, . . . ), and wherein said second number of mold cores is equal to said first number of framework elements, whereby a single mold core is provided for each framework element for simultaneously casting all framework elements and said outer skin together in said mold and core assembly.

2. The mold and core assembly of claim 1, wherein said single mold core comprises a longitudinal land (2000) and cross stubs (2011, 2012, 2013, 2014, 2015, 2016) arranged on opposite sides of said longitudinal land (2000) so that two of said cross stubs are aligned with each other on opposite sides of said longitudinal land so that said cross stubs are spaced from each other by said longitudinal land (2000).

3. The mold and core assembly of claim 2, wherein at least one mold part of said first and second mold parts comprises mold markers ($m_1$, $m_2$) forming guides for the insertion of said mold cores (101, 102, . . . ) into said at least one mold part, wherein said mold markers ($m_1$, $m_2$) have a defined spacing from each other, and wherein each of said cross stubs has an axial length perpendicularly to said longitudinal land, said axial length corresponding to said defined spacing between said mold markers ($m_1$, $m_2$).

4. The mold and core assembly of claim 1, wherein said second number of mold cores extend longitudinally in parallel to a longitudinal central aircraft axis and in parallel to each other, and wherein said second number of mold cores are spaced from each other circumferentially relative to said longitudinal aircraft axis.

5. The mold and core assembly of claim 1, wherein each said single mold core for each framework element comprises a trapezoidal core cross-section, a longitudinal land (2000) and cross stubs extending laterally from said longitudinal land, and wherein said trapezoidal cross-section extends perpendicularly to a longitudinal axis of said longitudinal land.

6. The mold and core assembly of claim 1, wherein each said single mold core for each framework element comprises at least one core type and four core types ($A_0$, B, C, D) at the most.

7. The mold and core assembly of claim 1, wherein each said single mold core for each framework element comprises at least one groove ($A_4$, $A_5$) selected from circumferential and cross grooves positioned in said single mold core on a core side facing said outer skin for casting outer skin stiffeners.

8. The mold and core assembly of claim 1, wherein each said single mold core for each framework element comprises a longitudinal land ($A_1$) having a trapezoidal cross-section perpendicularly to a longitudinal axis of said single mold core, said longitudinal land ($A_1$) having a first side (a), a second side (e) extending in parallel to said first side (a) and third and fourth sides (b and c) interconnecting said first and second sides (a and e) to form said trapezoidal cross-section, and wherein said first side (a) has a width ($A_6$) that is smaller than a width ($A_7$) of said second side (e), whereby said second side forms a base of said trapezoidal cross-section of said single mold core for each framework element.

9. The mold and core assembly of claim 2, wherein said longitudinal land (2000) and said cross stubs (2011) of said single mold core for each framework element comprise a configuration for forming said framework element as a rib of an aircraft freight door, and wherein said cross stubs have an arcuate configuration for forming said rib with open arcs for forming a plurality of arches in said rib.

10. The mold and core assembly of claim 1, wherein all of said second number of mold cores are arranged in parallel to each other in one of said first and second mold parts.

11. The mold and core assembly of claim 10, wherein said mold cores arranged in parallel to each other are also arranged in parallel to a longitudinal aircraft axis for casting framework beams of said aircraft door simultaneously with said outer skin of said aircraft door.

12. The mold and core assembly of claim 10, wherein said mold cores arranged in parallel to each other are also arranged in parallel to a circumferential direction of an aircraft body for casting framework ribs of said aircraft door simultaneously with said outer skin of said aircraft door.

* * * * *